(12) United States Patent
Shwartz et al.

(10) Patent No.: US 12,050,946 B2
(45) Date of Patent: Jul. 30, 2024

(54) JUST IN TIME ASSEMBLY OF TRANSACTIONS

(71) Applicant: International Business Machines Corporation, Armonk, NY (US)

(72) Inventors: Larisa Shwartz, Greenwich, CT (US); Qing Wang, Chappaqua, NY (US); Jinho Hwang, Ossining, NY (US); Srinivasan Parthasarathy, White Plains, NY (US); Michael Elton Nidd, Zurich (CH); Frank Bagehorn, Dottikon (CH); Ota Sandr, Prague (CZ); Tomas Ondrej, Prague (CZ); Altynbek Orumbayev, Prague (CZ); Jakub Krchak, Jindrichuv Hradec (CZ); Michal Mylek, Vrané nad Vltavou (CZ)

(73) Assignee: International Business Machines Corporation, Armonk, NY (US)

( * ) Notice: Subject to any disclaimer, the term of this patent is extended or adjusted under 35 U.S.C. 154(b) by 629 days.

(21) Appl. No.: 17/026,372

(22) Filed: Sep. 21, 2020

(65) Prior Publication Data

US 2022/0091912 A1    Mar. 24, 2022

(51) Int. Cl.
G06F 9/46    (2006.01)
G06F 9/54    (2006.01)
(Continued)

(52) U.S. Cl.
CPC ............. *G06F 9/547* (2013.01); *G06F 9/466* (2013.01); *G06F 16/285* (2019.01); *G06N 20/00* (2019.01)

(58) Field of Classification Search
CPC ......... G06F 9/547; G06F 16/285; G06F 9/466
See application file for complete search history.

(56) References Cited

U.S. PATENT DOCUMENTS 9,274,848 B2    3/2016    Dawson
10,374,866 B1 *  8/2019    Berg .................... H04L 67/148
(Continued)

FOREIGN PATENT DOCUMENTS

CA    2777677 A1    4/2011
CN    105959138 B   5/2019
(Continued)

OTHER PUBLICATIONS

Qiu et al. A Novel Shortcut Addition Algorithm With Particle Swarm for Multisink Internet of Things. [online] 26 June. IEEE., pp. 3566-3577. Retrieved From the Internet <https://ieeexplore.ieee.org/abstract/document/8746550> (Year: 2019).*

(Continued)

*Primary Examiner* — Emerson C Puente
*Assistant Examiner* — Jonathan R Labud
(74) *Attorney, Agent, or Firm* — Michael O'Keefe (57) ABSTRACT

Embodiments of the present invention provide methods, computer program products, and systems. Embodiments of the present invention can dynamically determine one or more endpoints to fulfill a user request. Embodiments of the present invention can select the dynamically determined one or more endpoints as the one or more endpoints that fulfill the user request. Embodiments of the present invention can execute the selected one or more endpoints to fulfill the user request.

17 Claims, 4 Drawing Sheets

(51) Int. Cl.
*G06F 16/28* (2019.01)
*G06N 20/00* (2019.01)

(56) References Cited

U.S. PATENT DOCUMENTS

| | | | |
|---|---|---|---|
| 10,599,498 B2 | 3/2020 | Nakaike | |
| 2015/0006609 A1* | 1/2015 | Sampath | G06F 9/5072 709/202 |
| 2016/0154719 A9 | 6/2016 | Fan | |
| 2019/0102157 A1 | 4/2019 | Caldato | |
| 2020/0045131 A1* | 2/2020 | Nigam | H04L 67/02 |
| 2020/0092181 A1* | 3/2020 | Thiagarajan | H04L 43/062 |
| 2022/0197773 A1* | 6/2022 | Butler | G06F 9/5038 |

FOREIGN PATENT DOCUMENTS

| | | |
|---|---|---|
| CN | 109901922 A | 6/2019 |
| CN | 110022349 A | 7/2019 |
| CN | 110609782 A | 12/2019 |
| CN | 110855578 A | 2/2020 |

OTHER PUBLICATIONS

Authors et al. Disclosed Anonymously, "System and Process for Identifying Building Blocks Service based on Machine Learning", An IP.com Prior Art Database Technical Disclosure, IP.com No. IPCOM000248186D, IP.com Electronic Publication Date: Nov. 4, 2016, 4 Pages.

Merwe et al., "Data clustering using particle swarm optimization", The 2003 Congress on Evolutionary Computation, CEC '03., pp. 215-220, vol. 1, doi: 10.1109/CEC.2003.1299577, Canberra, ACT, Australia, 2003, 6 pages.

Xu et al., "CS-PSO: chaotic particle swarm optimization algorithm for solving combinatorial optimization problems", Soft Comput 22, Oct. 3, 2016, 13 Pages.

* cited by examiner

JUST IN TIME ASSEMBLY OF TRANSACTIONS

BACKGROUND

The present invention relates generally to communication between microservices, and more particularly to a just in time assembly of transactions for microservices.

Traditional microservices are a software development technique, specifically a variant of the service-oriented architecture (SOA) structural style, that arranges an application as a collection of services. Thus, microservices (or microservice architecture) use a cloud-native architectural approach in which a single application is composed of many loosely coupled and independently deployable smaller components, or services. These services typically have their own stack, inclusive of the database and data model and communicate with one another over a combination of representational state transfer application programming interfaces (REST APIs), event streaming, and message brokers. The services are also typically organized by business capability, with a line separating services often referred to as a bounded context.

Microservices deployed in cloud environments typically use cloud APIs to communicate between each other. These APIs are typically implemented by way of a REST call, such as a HyperText Transfer Protocol (HTTP) REST call. For a simple REST function, most of the processing required to service that function includes marshalling, transmitting and unmarshalling of a request used to make the API call. Marshalling refers to the process of transforming a memory representation of an object to a data format suitable for storage or transmission, and it is typically used when data must be moved between different parts of a computer program/service or from one program/service to another. Unmarshalling refers to unpacking the data format by transforming the data format back into a memory representation.

Servicing the function may also include encrypting and decrypting the API calls as they are made over the network. As a result, the majority of the processing performed to make an HTTP REST function call is performed by way of excess and/or indirect computation time, memory, bandwidth, or other resources that are required to perform the task (i.e. computing overhead), instead of using application logic.

Different service end points can be implemented to deliver optimal performance depending on the data provided. In some cases, methods can be used to alert and event grouping temporal, spatial and Apriori (i.e., unsupervised learning). In general, users define which service end-point, or its combination to use at solution/system deployment time.

SUMMARY

According to an aspect of the present invention, there is provided a computer-implemented method. The method comprises dynamically determining one or more endpoints to fulfill a user request; selecting the dynamically determined one or more endpoints as the one or more endpoints that fulfill the user request; and executing the selected one or more endpoints to fulfill the user request.

BRIEF DESCRIPTION OF THE DRAWINGS

Preferred embodiments of the present invention will now be described, by way of example only, with reference to the following drawings, in which.

DETAILED DESCRIPTION

Embodiments of the present invention recognize that users typically define which service endpoint or its combination to use at solution/system deployment time. This selection can lead to maintenance challenges and/or potentially degrading solution perform. Embodiments of the present invention provide solutions to these challenges by dynamically determining which specific method/service endpoint to execute for a specific data set to get an overall best of the solution/system. Specifically, for software systems that are rule-driven or have probabilistic nature (AI/ML) driven, and implemented as microservices framework, the final, optimal result is not necessarily, a result of best approaches from each service.

Embodiments of the present invention dynamically determine which method or service endpoint to use by providing an optimization system that produces a result that is best, overall. In this embodiment, "best overall" can be defined as an optimal solution that satisfies a user's requirements in an efficient manner (e.g. using the least amount of resources, processing faster, etc.). Certain embodiments of the present invention can further transmit results (e.g., recommendations) to users upon complete.

In an example environment, there can be services with multiple end points, each one uses different artificial intelligence (AI) methods. Each service has an ability to assess performance of each end point (e.g., quality of results, performance, etc.) for specific data (e.g., a user). Each service could be used consequently or parallel within a product/system. Embodiments of the present invention optimizes a service chain (e.g., comprising service end points) that satisfies a user request while maintaining that each service can make autonomous decision on a respective "best" method/end-point. In other words, embodiments of the present invention can select a different end point than the endpoint selected by its service if the different end point produces a more optimal service chain.

Figure 1:
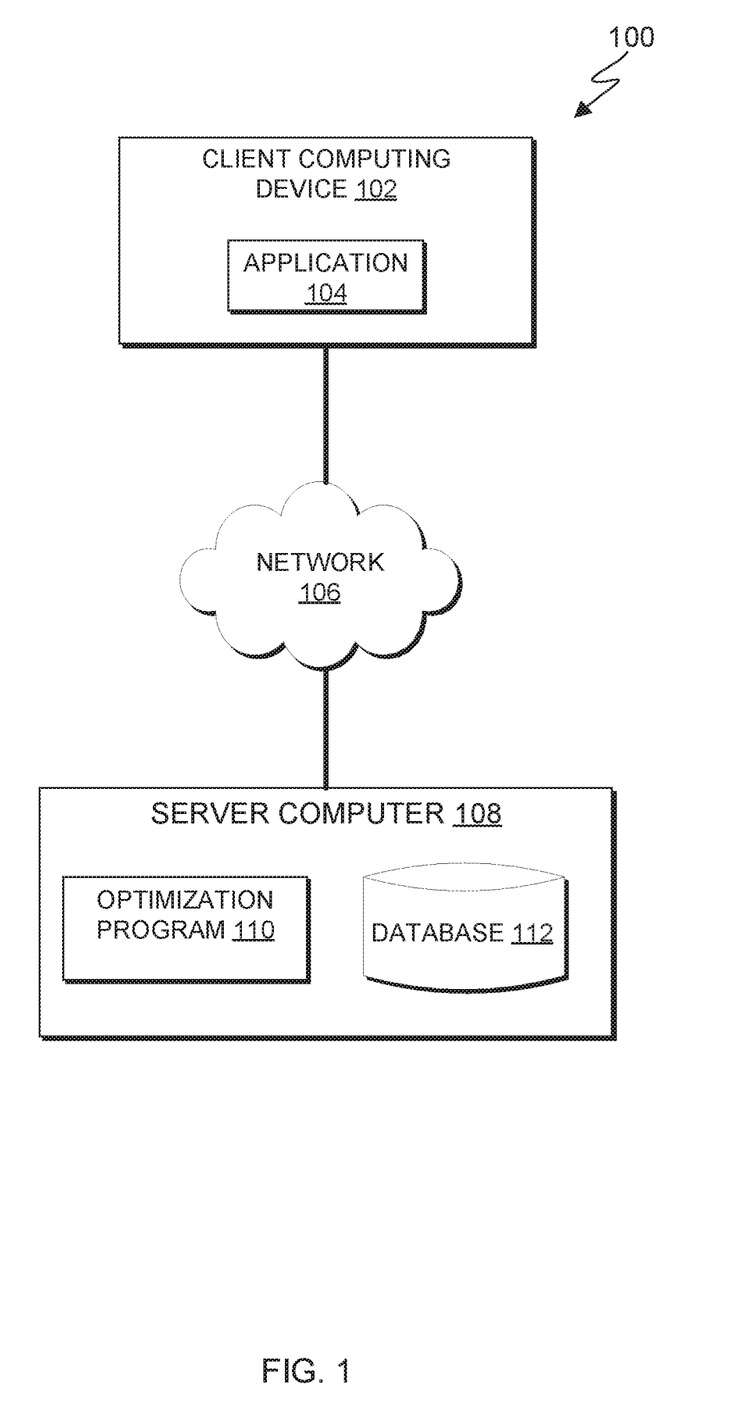
FIG. 1 depicts a pictorial representation of an example computing system, in accordance with an embodiment of the present invention.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. Client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computer as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 4.

In this embodiment, client computing device 102 is an electronic vehicle (e.g., a digital device) associated with a user and includes application 104. Application 104 communicates with server computer 108 to access optimization program 110 (e.g., using TCP/IP) to access user and database information. Application 104 can further communicate with optimization program 110 to transmit instructions to dynamically determining which specific method/service endpoint to execute for a specific data set to get an overall best of the solution/system, as discussed in greater detail with regard to FIGS. 2-4.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts optimization program 110 and database 112. In this embodiment, optimization program 110 resides on server computer 108 and can be implemented in different infrastructures, such as a 5G infrastructure that interacts with cloud computing servers. In other embodiments, optimization program 110 can have an instance of the program (not shown) stored locally on client computer device 102. In yet other embodiments, optimization program 110 can be stored on any number or computing devices.

In this embodiment, optimization program 110 dynamically determines a specific endpoint to execute for a specific data set to get an overall best of the solution/system in response to received user request to solve a combinatorial optimization problem. In this embodiment, optimization program 110 uses particle swarm optimization however, in other embodiments, any search algorithm or metaheuristic can be used. For example, in this embodiment optimization program 110 dynamically determines a specific endpoint by (1) calculating a "cost" score for each model in each service (e.g., an alert grouping service used to find the occurrence pattern having three machine learning models) and total cost C. Optimization program 110 can then (2) initialize the particles, that is, initializing or otherwise generating solutions, (e.g., 20 particles) with constrains and initialization the velocities of each particles to be 0. As used herein, a particle is a solution (e.g., a solution space). Optimization program 110 can then update the particle to find the optimal particle (i.e., solution) by (3) calculating a fitness value fp of each particle and then (4) determine a local best solution in the solution space ($P_{best}$) and global best solution ($G_{best}$) and calculate the velocity to update previous particle position. Optimization program 110 can then iteratively perform steps (3) and (4) until maximum iteration achieved. Each of steps 1-4 are explained in greater detail below.

Figure 2:
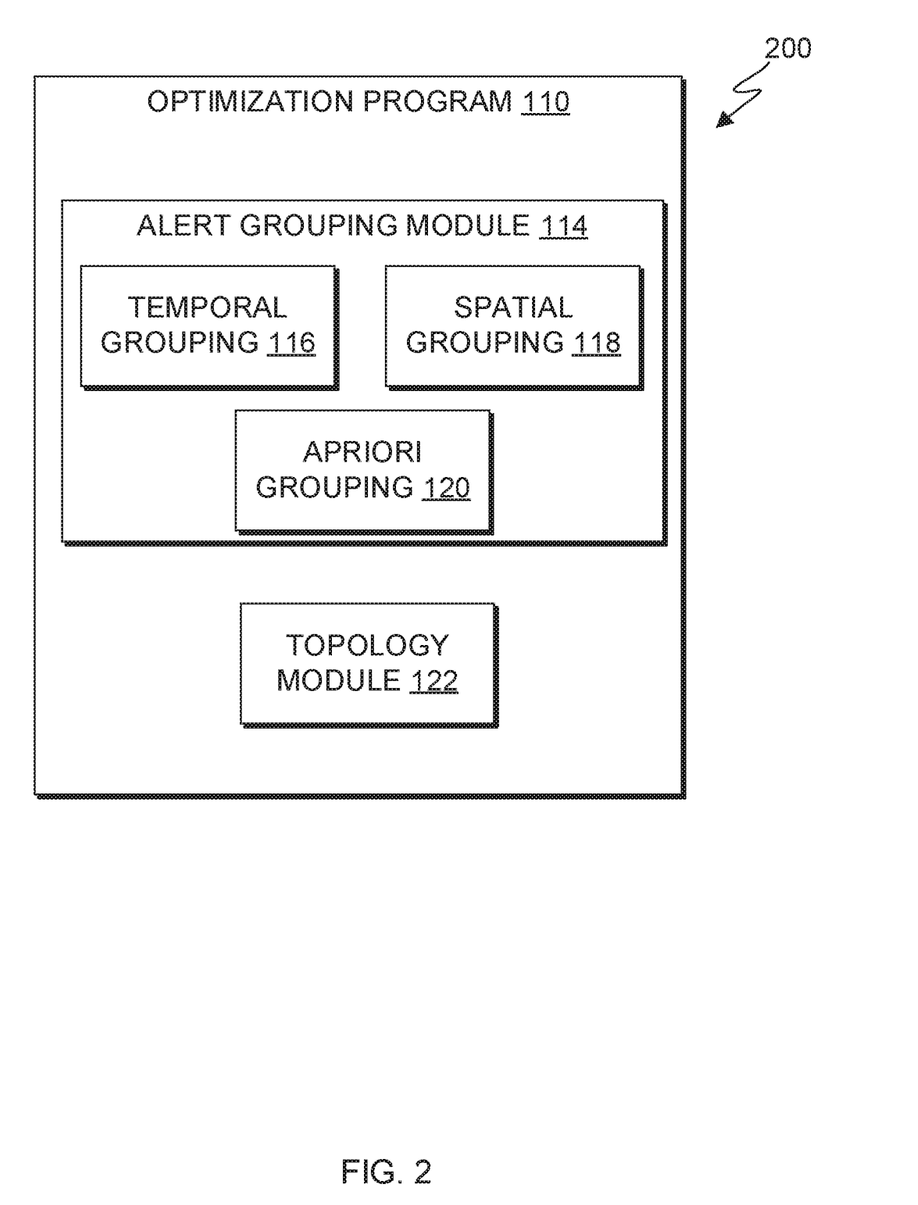
FIG. 2 is a functional block diagram illustrating components of an optimization program, in accordance with an embodiment of the present invention.

In this embodiment, optimization program 110 includes an alert grouping module (not shown) and a topology module (not shown) that enables optimization program 110 to optimize a service chain as described in greater detail with regard to FIG. 2. In this embodiment, alert grouping module includes at least three machine learning modules for alert grouping. For example, the alert grouping module can include a temporal-based grouping model, a spatial-based grouping module, and an Apriori-based grouping module. In general optimization program 110 can include a variety of constraints (e.g., time and space complexities).

Optimization program 110 can use a specific dataset as input training data. In this embodiment, a dataset can include one or more services with multiple end points forming a service chain that can execute a user task. For example, a product could contain three services such as service for records classification, service for grouping relevant symptoms, and service for localizing an issue. A service, as used herein, generally refers to software that is managed for users. A service can also refer to one or more methods for solving a combinatorial optimization problem and can be used to assemble machine learning models. A service can include APIs that users never use directly. Services can also include websites that users use but do not install or manage themselves. Endpoints, as used herein, refer to points of entry or exit for data exchanged by services. For example, endpoints can include Representational State Transfer (REST) requests are sent from HTML pages.

Optimization program 110 can then analyze components of a service chain comprising multiple services (i.e., end points) and generate recommendations as to which specific endpoints in a service chain to select that results in optimal performance (e.g., as defined by user requirements). In this embodiment, optimization program 110 can optimize components (e.g., services and/or methods in a service chain, components in a product, etc.) using a particle swarm optimization. Optimization program 110 can combine a fitness function used in the particle swarm optimization to evaluate product performance of a combinatorial optimization scheme. Finally, optimization program 110 can reassess and produce an optimal (e.g., best) assembly of machine learning models in each service according to user requirements. For example, with respect to customer A's data, optimization program 110 can choose a temporal-based cluster model (e.g., alert grouping service) and causal graph-based model (e.g., fault localization service) while selecting the Apriori model (e.g., alert grouping service) and causal golden signal-based model (e.g., fault localization service) for customer B's data. In this embodiment, optimization program 110 can further include a service gateway that enforces or, in some circumstances, overwrites a service choice of the recommended endpoint. As discussed in greater detail below, optimization program 110 can initialize a particle, randomly generate, for each particle a best service module recommendation for a user request by combining equations 1-6 and using algorithm 1.

In this embodiment, optimization program 110 can express its objective function as below as equation 1 and constraints used can be represented by equations 2 and 3.

$$\max \Sigma_{i=1}^{K} \Sigma_{j=1}^{n_i} \omega_{i,j} x_{i,j} \quad\quad\quad 1)$$

Where i is the index of the component category (e.g., an alert or grouping component, wherein the grouping component comprises three different unsupervised machine learning models for grouping alerts/events: temporal based clustering model, spatial-based clustering model, and Apriori model). An index refers to how many service components (e.g., alert grouping service, fault localization service, anomaly detection service) exist in the system, j is the index of the machine learning model for each component category, K is the total number of components, $n_i$ is the total number of the machine learning models of the i-th component, $x_{i,j}$ is the j-th machine learning model of the i-th component, and $\omega_{i,j}$ is the j-th machine learning model of the i-th component.

For example, K could have two service components (e.g., K=2) service components (e.g., alert grouping service and fault localization service) in your system and the constrain value (i.e., cost) of 10 (e.g., C=10), which is used to constrain the resource usage (e.g., CPU usage, memory usage, model complexity, running time, etc.) of cloud computing of these machine learning models.

In this example, Alert grouping service (i=1) includes 1) Temporal-based clustering model, $C_{1,1}$=2, 2) Spatial-based clustering model, $C_{1,2}$=4, and 3) Apriori model, $C_{1,2}$=5. Fault localization service (i=2) includes: 1) Rule-based model, $C_{2,1}$=2, 2) Causal graph-based model, $C_{2,2}$=7, and 3) Golden signal-based model, $C_{2,3}$=3. Because C=10 and in each service, optimization program 110 can only choose one machine learning model, so $C_{1,1}+C_{2,2}$=2+7<10, $C_{1,1}+C_{2,1}$=2+3<10, . . . , etc. of the many possible combinations.

$$\Sigma_{i=1}^{K} \Sigma_{j=1}^{n_i} c_{i,j} x_{i,j} \leq C \quad\quad\quad 2)$$

Where $c_{i,j}$ is the cost of j-th machine learning model of the i-th component, C is the total cost. In this embodiment, if the j-th machine learning model of the i-th component is selected, then $x_{i,j}$=1.

For example, optimization program 110, leveraging an alert grouping service (i=1) includes:

Temporal-based clustering model, $C_{1,1}$=2
Spatial-based clustering model, $C_{1,2}$=4
Apriori model, $C_{1,2}$=5.
We have $x_{1,1}$, $x_{1,2}$, and $x_{1,3}$ where i=1 and $n_i$=3.

If Temporal-based clustering model is selected to use, then optimization program 110 calculates the following values:

$x_{1,1}$=1,
$x_{1,2}$=0,
$x_{1,3}$=0.

If Spatial-based clustering model is selected to use, then optimization program 110 calculates the following values:

$x_{1,1}$=0,
$x_{1,2}$=1,
$x_{1,3}$=0.

If Apriori model is selected to use, then optimization program 110 calculates the following values $x_{1,1}$=0,
$x_{1,2}$=0,
$x_{1,3}$=1.

$$\Sigma_{j=1}^{n_i} x_{i,j}=1, \forall i=\{1, \ldots, K\} \quad\quad\quad 3)$$

Optimization program 110 can then map the particle swarm optimization to generate service module recommendations (as discussed in greater detail below). In this embodiment, a particle refers to a solution position in the solution space. A particle position refers to a current solution position in the solution space. Particle velocity refers to the solution improvement. $P_{best}$ refers to a local best solution in the solution space. $G_{best}$ refers to a global best solution (e.g., an optimal service chain that satisfies the user request).

$$B_i=[x_{i,1}, \ldots, x_{i,n_i}], \text{ where } i \in [1, \ldots, K] \quad\quad\quad 4)$$

With respect to equation 4, $B_i$ refers to a vector that expresses the i-th component and $n_i$ refers to the total number of models in the i-th component where $i \in [1, \ldots, K]$.

$$X_p=[B_1, \ldots, B_K], \text{ where } p=[0, \ldots, P-1] \text{ and}$$
$$\Sigma_{i=1}^{K} \Sigma_{j=1}^{n_i} c_{i,j} x_{i,j} \leq C \text{ the dimension of each particle } p \text{ is } \Sigma_{i=1}^{K} n_i \quad\quad\quad 5)$$

With respect to equation 5, the position of a particle p as a vector (e.g., $X_p$).

$$X_p=X_p+V_p \quad\quad\quad 6)$$

With respect to equation 6 refers to the position of a particle (e.g., $X_p$) expressed as equaling particle velocity ($V_p$) added to a particle velocity. Equation 6 can be expanded into equation 7, reproduced below:

$$V_p=\omega V_p+c_1 * \text{rand}()*(X_{pBest}-X_p)+c_2*\text{rand}()*(X_{gBest}-X_p)//\text{rand}() \sim U(0,1), c_1+c_2=4. \quad\quad\quad 7)$$

In this embodiment, optimization program 110 combines equations 1-7 using the following algorithm (e.g., algorithm 1):

---

Algorithm 1:

---

P = Particle_Initialization( )
  randomly generate $B_i = [x_{i,1} = 1, \ldots, x_{i,n_i} = 0]$, $\Sigma_{j=1}^{n_i} x_{i,j} = 1$,
  $\forall\ i = \{1, \ldots, K\}$
  each particle $X_p = [B_1, \ldots, B_K]$, where $p = [0, \ldots, P-1]$ and
  $\Sigma_{i=1}^{K} \Sigma_{j=1}^{n_i} c_{i,j} x_{i,j} \leq C$
Initialize each particle's velocity: $V_p = 0$, where $p = [0, \ldots, P-1]$ and
and $\Sigma_{i=1}^{K} \Sigma_{j=1}^{n_i} c_{i,j} x_{i,j} \leq C$ $$V_0 = V_1 = \ldots = V_p = \begin{bmatrix} 0, 0, 0 \\ 0, 0, 0 \end{bmatrix}$$

for m = 1 to $n_{iter}$ :
  for each particle p in P:
    fp = f($X_p$)
    if fp is better than f($X_{pBest}$):
      $X_{pBest} = X_p$
  end
$X_{gBest} = X_{pBest}$ in P
  for each particle p in P:
    $V_p = \omega V_p + c_1 * \text{rand}() * (X_{pBest} - X_p) + c_2 * \text{rand}() *$
    $(X_{gBest} - X_p) // \text{rand}() \sim U(0, 1), c_1 + c_2 = 4.$
    $X_p = X_p + V_p$, where $\Sigma_{i=1}^{K} \Sigma_{j=1}^{n_i} c_{i,j} x_{i,j} \leq C$ and $\Sigma_{j=1}^{n_i} x_{i,j} = 1$.
  end
end

---

In an example that illustrates how Algorithm 1 works, there could be two service components such as an alert grouping service and a fault localization service. For Particle initialization, (e.g., $B_i$(e.g., [$x_{i,1}$=1, . . . , $x_{i,n_i}$=0])), an example of a particle $X_0$ (a solution). 2 services ($B_1$ and $B_2$).
Randomly Generate $B_1$=[1,0,0], $B_2$=[0,0,1]
  $B_1$=[1, 0, 0], alert grouping service's temporal-based model is selected.
  $B_2$=[0, 0, 1], fault localization service's golden signal-based model is selected.
$X_0$=[$B_1$, $B_2$] $B_1$=[1,0,0], $B_2$=[0,0,1], $$X_0 = \begin{bmatrix} 1, 0, 0 \\ 0, 0, 1 \end{bmatrix},$$

and ($C_{1,1}$=2)+($C_{2,3}$=3)<=(C=10) (total cost)

In this example, we have 20 particles (P=20) like this $X_0$ to test whether it is the best solution using particle swarming optimization (PSO).

In this scenario, K=2. The constrain could be set to 10 (e.g., C=10). You have 2 (K=2) service components (alert grouping service and fault localization service) in your system. And the constrain C=10.

Alert grouping service component (i=1) includes:
Temporal-based clustering model, $C_{1,1}$=2
Spatial-based clustering model, $C_{1,2}$=4
Apriori model, $C_{1,2}$=5.
Fault localization service component (i=2) includes:
Rule-based model, $C_{2,1}$=2
Causal graph-based model, $C_{2,2}$=7
Golden signal-based model, $C_{2,3}$=3

For example, where $X_1$, optimization program 110 (e.g., alert grouping service component) selects the temporal-based clustering model if [1,0,0]. If [0,1,0], then optimization program 110 selects causal graph-based model.

Where $X_2$, optimization program 110 can calculate the following results [[0,1,0] and [1,0,0]]. This process can be repeated for twenty times (e.g., 20 particles total, P=20) to generate 20 particles total, wherein each particle is a solution.

In this embodiment, optimization program 110 can calculate the optimal solution to be [[1,0,0] and [1,0,0]]. Accordingly, by following the steps performed by Algorithm 1, optimization program 110 can receive input data, and select temporal-based clustering model (e.g., alert grouping) as well as rule-based model (fault localization) and generate a recommendation.

In another example constrain could be set to 10 and initialize 3 particles, optimization program 110 can then calculate the following:
1) Constrains, C=10,
  $C_{1,1}$=2, $C_{1,2}$=4, $C_{1,2}$=5
  $C_{2,1}$=2, $C_{2,2}$=7, $C_{2,3}$=3
2) Initialization: 3 Particles $$X_0 = \begin{bmatrix} [1, 0, 0], \\ [0, 0, 1] \end{bmatrix}$$

(temporal − based model and golden signal − based model)

$$X_1 = \begin{bmatrix} [1, 0, 0], \\ [0, 0, 1] \end{bmatrix}$$

(spatial − based model and golden signal − based model)

$$X_2 = \begin{bmatrix} [0, 0, 1], \\ [0, 1, 0] \end{bmatrix}$$

(Apirori − based model and causal graph − based model)

Initialize Each Particle's Velocity using:

$$V_0 = V_1 = V_2$$

$$\begin{bmatrix} [0, 0, 0], \\ [0, 0, 0] \end{bmatrix}$$

3) for 1 to $n_{iter}$:
  for each particle p in P:
    f_best=0
    fp_0_best=max{f($X_{0Best}$), f($X_0$)}=1.2
    fp_1_best=max{f($X_{1Best}$), f($X_1$)}=3.2
    fp_2_best=max{f($X_{2Best}$), f($X_2$)}=5.0, f is the fitness function
    gBest=max{fp_0, fp_1, fp_2}
    $X_{gBest}$=$X_2$ (i.e., Apriori-based model and causal graph-based model is the best combination for this data)
  for each particle p in P:

$$V_p = \omega V_p + c_1 * \text{rand}(\ ) * (X_{pBest} - X_p) + c_2 * \text{rand}(\ ) * (X_{gBest} - X_p) // \text{rand}(\ ) \sim U(0,1), c_1 + c_2 = 4.$$

$$X_p = X_p + V_p \text{ with the constrain } \Sigma_{i=1}^{K} \Sigma_{j=1}^{n_i} c_{i,j} x_{i,j} \leq C \text{ and } \Sigma_{j=1}^{n_i} x_{i,j} = 1$$

Processing by optimization program 110 then ends as optimization program 110 finds a global optimal solution after iteration optimization using:

$$X_{gBest} = \begin{bmatrix} [0, 0, 1], \\ [1, 0, 0] \end{bmatrix}$$

Accordingly, optimization program 110 selects the Apriori model in alert grouping service and Rule-based model in fault localization service.

In another example, the above-described particle swarm optimization, performed by optimization program 110 can be used to solve a user-defined a problem (e.g., food purchase) based on certain criteria (e.g., a fitness function) as a target (e.g., more calories, vegetables, balanced diet, i.e., variables defined by the user)) as illustrated in Example 1 below:

Example 1

Vegetables (e.g., Like a Service Component):
  tomato: $2/per, calories: 10 (e.g., like a model in this service)
  cucumber: $3/per, calories: 20 (e.g., like a model in this service)
  . . .
Protein (Like a Service Component):
  fish: $10/per, calories: 100 (e.g., like a model in this service)
  egg: $3/per, calories: 50 (e.g., like a model in this service)
  . . .
Optimization program 110 can calculate the following scores: score (cost of tomato)=2, score (performance of tomato)=10, score (cost of cucumber)=3. score (performance of cucumber)=20, score (cost of fish)=10, score (performance of fish)=100. In this example, optimization program 110 can learn an optimal solution shown below:

$$X_{gBest} = \begin{bmatrix} [1, 0, 0], \\ [1, 0, 0] \end{bmatrix}$$

Accordingly, optimization program 110 recommends tomato and fish as the best solution for the user.

In this embodiment, optimization program 110 can then evaluate performance of the generated recommendation (e.g., evaluate the product performance of a combinations scheme expressed as a fitness function (e.g., equation 7 or 8). Optimization program defines each particle is a solution.

$$f(\cdot) = \text{score(constrains)} + \text{score(performance)} \quad 8)$$

where constrains equals cost, $f(\cdot)$ is a value of the fitness function (e.g., fp)

For example, after alert grouping and fault localization, the system will recommend the root cause r (one microservice (e.g., microservice down) is the root cause for this problem). The fitness function $f(\cdot)$ will give an score for this recommendation.

For example, one solution is alert_grouping: temporal-based model and fault_localization:rule-based model. Input alerts could include system (alert grouping: temporal-based model, fault_localization:rule-based model) and the recommendation could include: db microservice down.

In this embodiment, database 112 functions as a repository for stored content. In this embodiment, content refers to training data as well as user specific data. Content can include components, component categories, etc. In some embodiments, database 112 can function as a repository for one or more files containing user information. In this embodiment, database 112 is stored on server computer 108 however, database 112 can be stored on a combination of other computing devices (not shown) and/or one or more components of computing environment 100 (e.g., client computing device 102) and/or other databases that has given permission access to optimization program 110.

In general, database 112 can be implemented using any non-volatile storage media known in the art. For example, database 112 can be implemented with a tape library, optical library, one or more independent hard disk drives, or multiple hard disk drives in a redundant array of independent disk (RAID). In this embodiment database 112 is stored on server computer 108.

FIG. 2 is a functional block diagram 200 illustrating components of an optimization program, in accordance with an embodiment of the present invention.

This block diagram depicts certain components of optimization program 110. In this embodiment optimization program 110 can include alert grouping module 114 and topology module 122.

In this embodiment, alert grouping module 114 includes at least three machine learning modules for alert grouping. For example, alert grouping module 114 can include temporal-based grouping model 116, spatial based grouping module 118, and Apriori based grouping module 120.

Temporal based grouping refers to the extraction of implicit, non-trivial, and potentially useful abstract information from large collections of data and using it for grouping. Temporal data are sequences of data, most commonly numerical or categorical values and sometimes multivariate or composite information. Spatial based grouping is the extraction of knowledge/spatial relationship and interesting measures that are not explicitly defined in the data and grouping the data based on these relationships. Apriori based grouping is a frequent item set grouping that identifies the frequently repeated individual items and extending them to larger and larger item sets as long as those item sets appear sufficiently often in the database.

In this embodiment, topology module 122 is a module or service that contains information about topology of software-system/application deployment, and horizontal (or static) topology that describes transactions. In this disclosure topology is redefined to use appropriate service.

Figure 3:
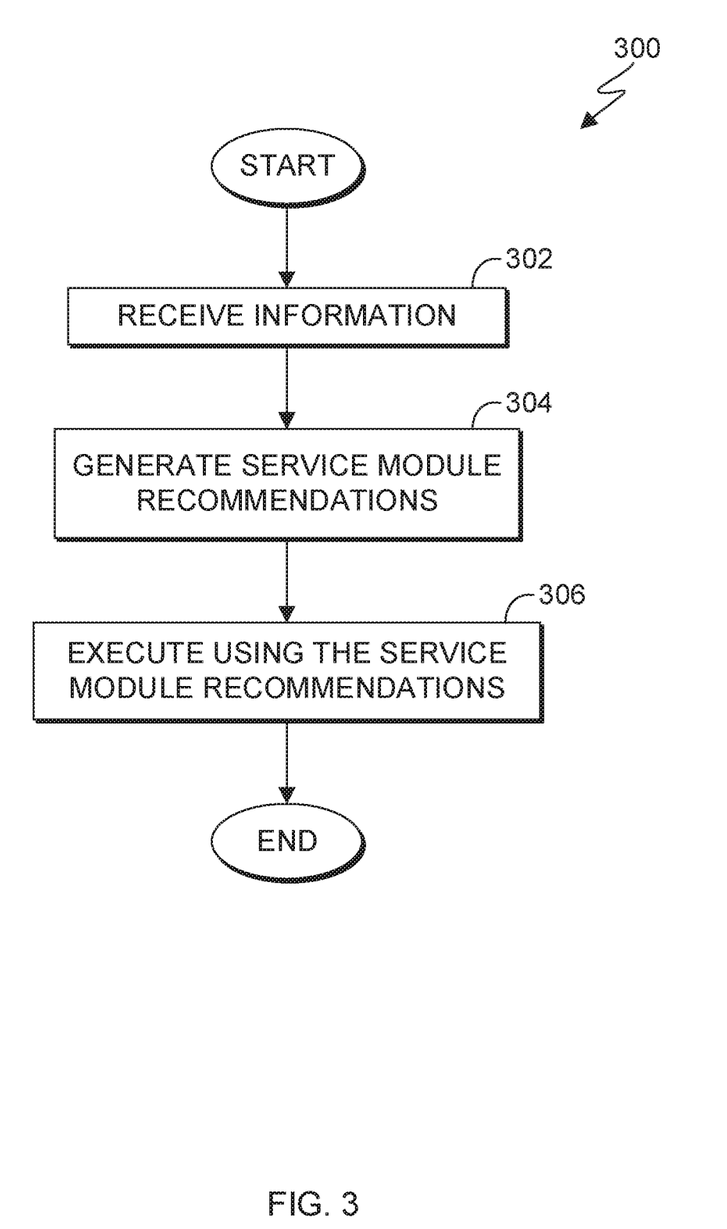
FIG. 3 is a flow diagram of a computer-implemented method for dynamically determining which specific endpoint to execute for a specific data set to get an overall best solution between a plurality of microservices, in accordance with an embodiment of the present invention.

FIG. 3 is a flow diagram 300 of a computer-implemented method for dynamically determining which specific endpoint to execute for a specific data set to get an overall best solution between a plurality of microservices, in accordance with an embodiment of the present invention.

In step 302, optimization program 110 receives information. In step 302, optimization program 110 receives information from client computing device 102. In other embodiments, optimization program 110 can receive information from one or more other components of computing environment 100.

In this embodiment, information can include one or more training and user data. For example, training data and user data can include one or more products or services comprising one or more components (e.g., services). In other words, each service of the one or more services can have one or more components (e.g., endpoints). Each service can calculate or otherwise select an optimal component (e.g., particle) to perform a requested function. In this embodiment, the one or more components represent an instance of a method or service. Information can also include a request to determine one or more endpoints that fulfill or otherwise satisfy a user request to determine a globally optimal solution.

In step 304, optimization program 110 generates service module recommendations. In this embodiment, optimization program 110 generates service module recommendations by using equations 1 through 5 and combining them using algorithm 1.

For example, optimization program 110 randomly generate a score for each component in product, wherein each component may be a service or method having one or more endpoints. In this embodiment, optimization program 110 randomly generates a score using the equation below:

$$\text{randomly generate } B_i = [x_{i,1} = 1, \ldots, x_{i,n_i} = 0], \Sigma_{j=1}^{n_i} x_{i,j} = 1, \forall i = \{1, \ldots, K\} \quad 9)$$

Optimization program 110 can then, for each component (particle), determine whether the score generated by optimization program 110 fp is greater than the service/endpoint score (e.g., local solution). In this embodiment, a numeric scale is used where greater numbers indicate a higher value and lesser numbers indicate a lesser value (e.g., a value of ten is greater than a value of two).

In this embodiment, if the score generated by optimization program 110 for a component/particle is better than the component/particle score that is produced locally by its respective service, then optimization program 110 selects the score it generated as the "best" score and select that component over the service generated score.

In this embodiment, if the score generated by optimization program 110 for a component is not better (e.g., greater) than the component/particle score that is produced locally by its respective service (e.g., in response to determining that the generated score is not better than the local score), then optimization program 110 selects the service selected component as "the best" score.

Optimization program 110 then repeats this step iteratively until all components are evaluated using the formula below.

for each particle p in P:

randomly generate $V_p = \omega V_p + c_1 * \text{rand}(\ ) * (X_{pBest} - X_p) + c_2 * \text{rand}(*(X_{gBest} - X_p) // \text{rand}(\ ) \sim U(0,1), c_1 + c_2 = 4.$ (10)

Optimization program 110 can then use the fitness function to evaluate performance (e.g., equation 7) as previously discussed with respect to FIG. 1.

In step 306, optimization program 110 executes using the service module recommendation. In this embodiment, optimization program 110 executes the product or service using the generated recommendations.

Optionally, optimization program 110 can generate an alert to a user to notify the user of one or more changes to the product (e.g., changes in services selected). In this embodiment, optimization program 110 can provide a manual override to allow a user to configure user selected services.

Figure 4:
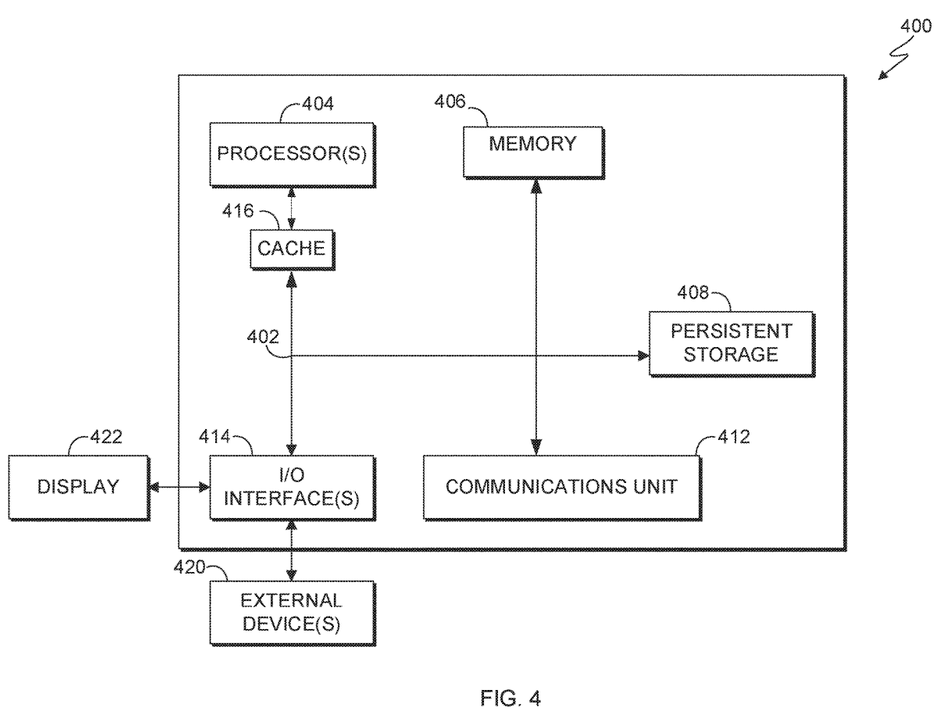
FIG. 4 is a block diagram of an example system, in accordance with an embodiment of the present invention.

FIG. 4 depicts a block diagram of components of computing systems within computing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 400 includes communications fabric 402, which provides communications between cache 416, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Optimization program 110 (not shown) may be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links. Optimization program 110 may be downloaded to persistent storage 408 through communications unit 412.

I/O interface(s) 414 allows for input and output of data with other devices that may be connected to client computing device and/or server computer. For example, I/O interface 414 may provide a connection to external devices 420 such as a keyboard, keypad, a touch screen, and/or some other suitable input device. External devices 420 can also include portable computer readable storage media such as, for example, thumb drives, portable optical or magnetic disks, and memory cards. Software and data used to practice embodiments of the present invention, e.g., optimization program 110, can be stored on such portable computer readable storage media and can be loaded onto persistent storage 408 via I/O interface(s) 414. I/O interface(s) 414 also connect to a display 422.

Display 422 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
dynamically determining one or more endpoints of a microservice chain to fulfill a user request based on a comparison of generated scores for components having respective endpoints using particle swarm optimization, wherein dynamically determining one or more endpoints to fulfill a user request comprises:
generating a score for each component in a product, wherein each component includes a service having one or more endpoints, and
determining whether the generated score for a respective component is better than a local score for the respective component;
selecting an optimal combination of one or more endpoints as the one or more endpoints that fulfill the user request based on the dynamic determination;
communicating to each of the one or more endpoints of the optimal combination of the one or more endpoints that fulfill the user request of changes to the microservice chain; and
executing the optimal combination of the one or more endpoints to fulfill the user request.

2. The computer-implemented method of claim 1, further comprising: determining an optimal combination of each component in the product to fulfill the user request.

3. The computer-implemented method of claim 1, further comprising: in response to determining that the generated score is not better than the local score, selecting an alternative instance of the respective component to fulfill the user request.

4. The computer-implemented method of claim 1, further comprising: in response to determining that the generated score is better than the local score, selecting the respective component to fulfill the user request.

5. The computer-implemented method of claim 1, further comprising:
evaluating performance of a respective component of a selected endpoint using a fitness function.

6. The computer-implemented of claim 1, wherein the product comprises an alert grouping module and a topology module, wherein the alert grouping module includes a temporal-based grouping, a spatial-based grouping, and Apriori-based grouping.

7. A computer program product comprising:
one or more computer readable storage media and program instructions stored on the one or more computer readable storage media, the program instructions comprising:
program instructions to dynamically determine one or more endpoints of a microservice to fulfill a user request based on a comparison of generated scores for components having respective endpoints using particle swarm optimization, wherein the program instructions to dynamically determine one or more endpoints to fulfill a user request comprise:
program instructions to generate a score for each component in a product, wherein each component includes a service having one or more endpoints, and
program instructions to determine whether the generated score for a respective component is better than a local score for the respective component;
program instructions to select an optimal combination of one or more endpoints as the one or more endpoints that fulfill the user request based on the dynamic determination
program instructions to communicate to each of the one or more endpoints of the optimal combination of the one or more endpoints that fulfill the user request of changes to the microservice chain; and
program instructions to execute the optimal combination of the one or more endpoints to fulfill the user request.

8. The computer program product of claim 7, wherein the program instructions stored on the one or more computer readable storage media further comprise: program instructions to determine an optimal combination of each component in the product to fulfill the user request.

9. The computer program product of claim 7, wherein the program instructions stored on the one or more computer readable storage media further comprise: program instructions to, in response to determining that the generated score is not better than the local score, select an alternative instance of the respective component to fulfill the user request.

10. The computer program product of claim 7, wherein the program instructions stored on the one or more computer readable storage media further comprise: program instructions to, in response to determining that the generated score is better than the local score, select the respective component to fulfill the user request.

11. The computer program product of claim 7, wherein the program instructions stored on the one or more computer readable storage media further comprise:
program instructions to evaluate performance of a respective component of a selected endpoint.

12. The computer program product of claim 7, wherein the product comprises an alert grouping module and a topology module, wherein the alert grouping module includes a temporal-based grouping, a spatial-based grouping, and Apriori-based grouping.

13. A computer system for comprising:
one or more computer processors;
one or more computer readable storage media; and
program instructions stored on the one or more computer readable storage media for execution by at least one of the one or more computer processors, the program instructions comprising:
program instructions to dynamically determine one or more endpoints of a microservice to fulfill a user request based on a comparison of generated scores for components having respective endpoints using particle swarm optimization, wherein the program instructions to dynamically determine one or more endpoints to fulfill a user request comprise:
program instructions to generate a score for each component in a product, wherein each component includes a service having one or more endpoints, and
program instructions to determine whether the generated score for a respective component is better than a local score for the respective component;
program instructions to select an optimal combination of one or more endpoints as the one or more endpoints that fulfill the user request based on the dynamic determination
program instructions to communicate to each of the one or more endpoints of the optimal combination of the one or more endpoints that fulfill the user request of changes to the microservice chain; and
program instructions to execute the optimal combination of the one or more endpoints to fulfill the user request.

14. The computer system of claim 13, wherein the program instructions stored on the one or more computer readable storage media further comprise: program instructions to determine an optimal combination of each component in the product to fulfill the user request.

15. The computer program product of claim 13, wherein the program instructions stored on the one or more computer readable storage media further comprise: program instructions to, in response to determining that the generated score is not better than the local score, select an alternative instance of the respective component to fulfill the user request.

16. The computer system of claim 13, wherein the program instructions stored on the one or more computer readable storage media further comprise: program instructions to, in response to determining that the generated score is better than the local score, select the respective component to fulfill the user request.

17. The computer system of claim 13, wherein the program instructions stored on the one or more computer readable storage media further comprise: program instructions to evaluate performance of a respective component of a selected endpoint.

* * * * *